Jan. 13, 1925. 1,522,982
G. STRANDT
AUTOMATIC MEANS FOR CONTROLLING THE FLOW OF LIQUID INTO A TANK
Filed Feb. 24, 1920
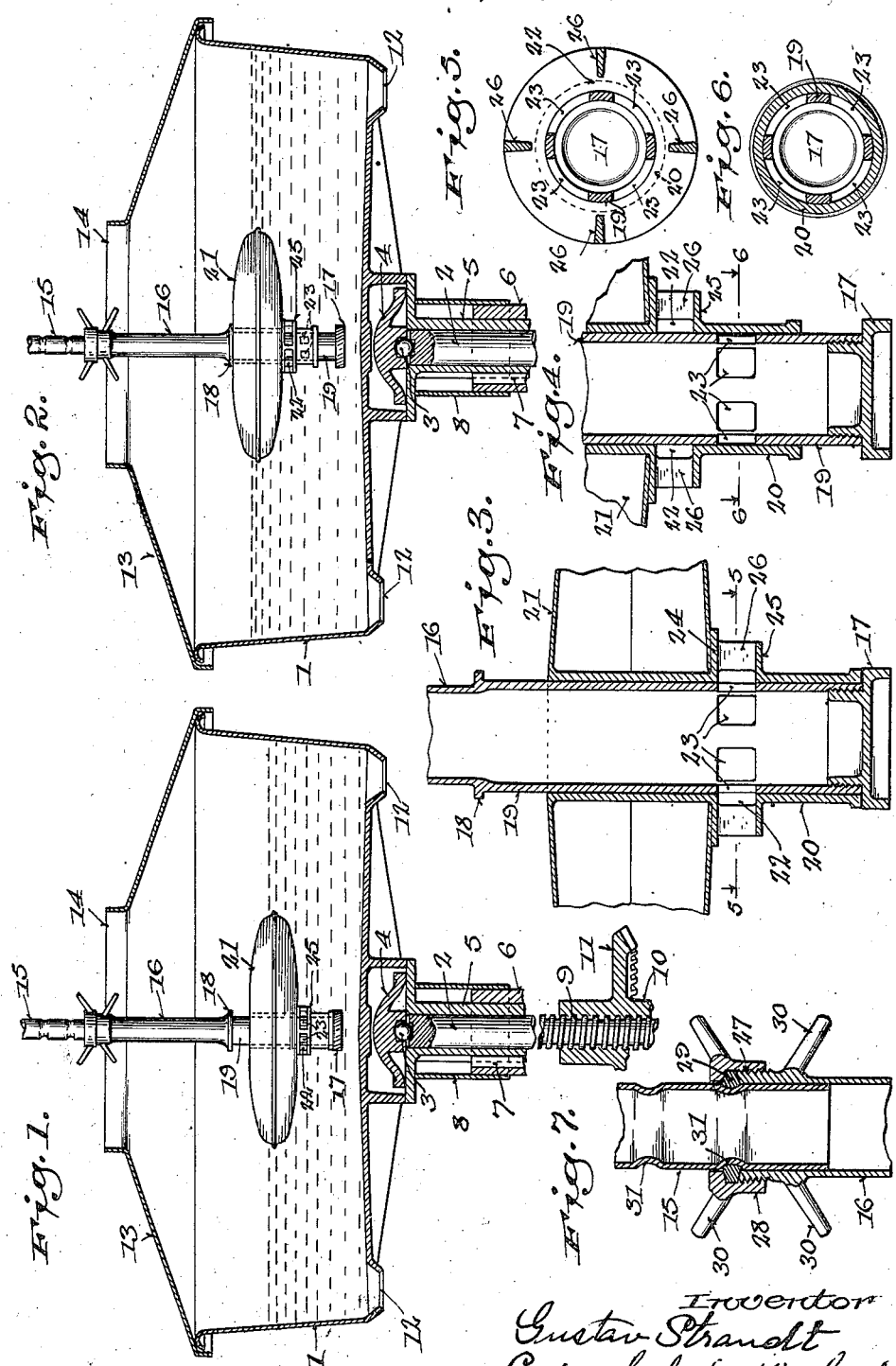

Patented Jan. 13, 1925.

1,522,982

UNITED STATES PATENT OFFICE.

GUSTAV STRANDT, OF MILWAUKEE, WISCONSIN, ASSIGNOR TO MILWAUKEE DAIRY SUPPLY MANUFACTURING CO., OF MILWAUKEE, WISCONSIN, A CORPORATION OF WISCONSIN.

AUTOMATIC MEANS FOR CONTROLLING THE FLOW OF LIQUID INTO A TANK.

Application filed February 24, 1920. Serial No. 360,562.

*To all whom it may concern:*

Be it known that I, GUSTAV STRANDT, a citizen of the United States, residing at Milwaukee, county of Milwaukee, and State of Wisconsin, have invented new and useful Improvements in Automatic Means for Controlling the Flow of Liquid into a Tank, of which the following is a specification.

This invention relates to milk bottling machines, and is particularly directed to means for controlling the flow of milk in the machine in accordance with the demands of the machine.

More particularly, the invention relates to an automatic valve and associated parts for controlling the height of the milk in a receiving tank, or distributor from which bottles are filled.

A very important object is to provide means for delivering milk to the tank underneath the float and with substantially uniform pressure in all directions thru an expanding nozzle or passage formed by a pair of horizontally disposed disks between the outer margins of which the milk is delivered at reduced velocity and pressure.

Objects of this invention are to provide a float operated valve which will minimize splashing and prevent frothing or foaming of the milk when such valve is open; prevent disturbance of the flow of the milk from the tank to the bottles; insure perfect agitation of the contents of the tank by causing the milk to enter beneath the surface of the milk in the tank; and prevent chattering.

Further objects are to provide a float operated valve which is vertically adjustable independently of any vertical adjustment of the tank; may be readily removed for cleaning; allowing sanitary condition to be easily maintained; is supported independently of the tank or the tank support; and which consists of a minimum number of parts.

In the drawings:—

Figure 1 is a vertical sectional view thru the tank, showing the float in lowered position.

Figure 2 is a similar view, showing the float in raised position.

Figure 3 is an enlarged fragmentary view of the float and the valve associated therewith, in the position shown in Fig. 1.

Figure 4 is a view corresponding to Figure 3, showing the position of the valve and float, as shown in Figure 2.

Figure 5 is a section on line 5—5 of Figure 3.

Figure 6 is a section on line 6—6 of Figure 4.

Figure 7 is a section thru the adjustable coupling means between the supply pipe and the downwardly extending tube, or continuation of such supply pipe.

This invention relates to a milk bottling machine of the type shown and described in a patent issued to me on March 7th, 1916, and numbered 1174453, and particularly relates to an improved means for controlling the flow of milk into the tank from which the milk is subsequently drawn to fill the bottles. The tank 1 is rotatably carried by a shaft 2, the weight of the tank being directly borne by a ball bearing 3 between the shaft 2 and a member 4 secured to the lower portion of the tank, and centrally thereof. In order to more securely hold the tank in rotative relation to the shaft 2, a tubular downwardly extending bearing member 5, carried by the tank, extends between the shaft 2 and a sleeve 6, such member 5 being slidably splined to the member 6, as indicated at 7. An outer housing 8, carried by the tank, is arranged to slide upon the outside of the member 6. The vertical adjustment of the tank is secured by causing the lower threaded portion 9 of the shaft 2 to be engaged by the threads of a nut 10 which forms a hub of a gear wheel 11. It will therefore be seen that the tank is adapted for rotary motion upon its vertical axis, such motion being imparted thereto by means of the member 6 and the spline connection 7, and is also adapted for vertical adjustment by means of a nut 10 and the screw 9. The adjustment of this tank in a vertical direction is desirable to accommodate bottles of different heights, and the rotary motion is desirable so that the tank may cooperate with the moving bottles, as is fully described in the patent above referred to.

The lower portion of the tank is provided with a series of openings 12, provided in a circle adjacent the lower outer edge of the bottom, such openings being adapted to receive filling nozzles. A cover 13 is provided for the tank 1, and may have a central opening 14.

The supply of milk to the tank 1 comes from a supply pipe 15, and passes down a continuation thereof 16, which is also a pipe or tube, and outwardly a slight distance above the bottom portion of the pipe thru the automatic valve to be hereinafter described. The bottom of the pipe is closed by a removable cap 17.

Figure 3 shows the tube or pipe 16 provided with an upper shoulder or flange 18, and a smooth, machined, cylindrical portion 19, extending downwardly below such flange to the extreme lower end of the tube. The cap 17 projects a slight distance outwardly from the cylindrical portion 19 when the cap is screwed in place, and thereby forms a bottom shoulder or collar. Slidably mounted upon this cylindrical portion 19 is a sleeve 20 which extends upwardly thru a float 21, and is secured to the under side of the float and integrally connected with the upper side thereof so as to form air-tight joints therewith. Below the float 21 an aperture in the form of a gap or an open annular space 22 is formed in the sleeve 20, as more clearly shown in Figure 5, such opening being adapted to register with a plurality of apertures 23 formed in the cylindrical portion 19 of the tube 16 when the float and sleeve are in the lower position. Annular members 24 and 25 are formed upon the sleeve 20 immediately above and below the annular opening 22, the upper member 24 contacting with the lower portion of the float 21. Webs 26 join these members 24 and 25 at intervals.

Figure 3 shows the apertures in the tube and the sleeve in registering position, so that the delivery of milk to the tank 1 is permitted. Figure 4 shows the location of aperture 22 with respect to the apertures 23 when the float is in the raised position.

By the arrangement of the annular members 24 and 25 immediately above and below the annular aperture 22, the milk passing outwardly thru the valve is caused to pass between such annular members 24 and 25, and is directed horizontally outwardly so as not to interfere with the milk passing thru the openings 12. Another function performed by this arrangement of members 24 and 25 and aperture 22 is that the velocity of the milk flowing outwardly between these members 24 and 25 is gradually lessened by such members, for the reason that the cross section of the flowing stream of milk is a cylinder of constantly increasing radius, as the outer edge of these annular members is approached, and as the quantity of milk passing any given cross section is for each instant uniform, it therefore follows that as the cross section increases, the velocity must necessarily decrease.

It will therefore be seen that means have been provided, whereby the discharging stream of milk passing outwardly from the valve has its velocity controlled and gradually lessened as it passes thru the structure of the valve and associated parts, and is discharged into the surrounding milk at a low and substantially uniform velocity in all directions.

Figure 7 shows the union or joint between the pipe 15 and the tube or pipe 16, which forms a continuation thereof, such joint comprising a threaded engagement 27 between the upper portion of the tube 16 and a nut 28 which surrounds the pipe 15. Between the upper portion of the pipe or tube 16 and the nut, a rubber gasket 29 is provided, which takes the form of an annular ring, and is adapted to be compressed when the nut 28 and the tube 16 are turned relatively to each other by means of the handles 30. When this rubber gasket 29 is compressed it projects inwardly into any one of a plurality of grooves 31 formed around the tube 15 at spaced intervals. By this means it is possible to both completely and readily remove the tube 16, or adjust its vertical position, thereby adjusting the position of the automatic valve. It will be noted that when the tube 16 is removed the bottom portion or cap 17 may also be removed, thereby allowing ready cleaning of the tube 16.

It will thus be seen that an independent support and adjustment has been provided for the automatic valve, which is distinct and separate from the adjustment of the tank, so that either the relative position of the tank and automatic valve may be changed, or else both the tank and the valve may be moved to such a position that the relative position of the two is the same while their absolute adjustment changes.

It will also be seen that an automatic valve has been provided which will discharge the milk radially therefrom in a substantially horizontal direction, and at a very low ultimate velocity, and that the shape and position of the float is such that it co-operates in the smooth discharge of the milk, and is also not canted or otherwise disadvantageously affected by the discharging milk.

I claim:

1. An automatic valve, for controlling the height of a liquid, comprising a tube having apertures formed therein, a sleeve arranged to slide upon said tube and open or close said apertures, means carried by the sleeve for directing the liquid radially outwardly and causing a gradual decrease in velocity of said liquid, and a float for controlling the position of said sleeve.

2. An automatic valve, for controlling the height of a liquid, comprising a tube having an aperture formed therein, an apertured sleeve arranged to slide upon said tube and open or close said aperture in the tube, by controlling the registering of aperture in said sleeve with the aperture in said tube, a float carried by said sleeve, and a pair of annular members carried by and surrounding said sleeve and positioned one above and one below the aperture in said sleeve.

3. An automatic valve, for controlling the height of a liquid, comprising a tube having an aperture therein, an apertured sleeve arranged to slide upon said tube and control the flow of liquid from said tube by controlling the registering of the apertures in said tube and sleeve, a pair of annular members carried by said sleeve so that the aperture in the sleeve is positioned between said annular members, whereby the liquid is caused to flow radially outwardly between said annular members with a substantially uniform velocity in all directions as it leaves said annular members, and an annular float carried by said sleeve and positioned immediately above the upper annular member.

4. An automatic valve, for controlling the height of a liquid by controlling its flow through a supply pipe, comprising a tube having apertures therein, means for removably and supportingly securing said tube to the supply pipe in a pendent position, removable means for temporarily closing the lower end of said tube, a sleeve arranged to slide upon said tube to control the amount of opening of said apertures, and a float for operating said sleeve.

5. An automatic valve, for controlling the height of a liquid by controlling its flow through a supply pipe, comprising a tube having apertures therein, means for removably and adjustably supporting said tube from said supply pipe in a pendent position, a sleeve arranged to slide upon said tube and control the amount of opening of said apertures, and a float for controlling the motion of said sleeve.

6. The combination with a tank of a vertically disposed supply pipe therein annularly ported and provided with an annular slide valve, a float encircling the pipe and operatively connected with the valve to open the ported portion of the pipe below the float, and a set of spaced flow controlling horizontally disposed annular plates between which liquid may flow in all directions uniformly and with diminishing pressure and velocity.

7. An automatic valve for controlling the flow of a liquid from a supply pipe into a tank, comprising a tube closed at its outer end and having apertures therein, means for removably and adjustably supporting said tube in a pendant position solely from said supply pipe independently of said tank, a sleeve adapted to slide upon said tube to control the amount of opening of said apertures, and a float for controlling the motion of said sleeve.

8. An automatic valve for controlling the flow of a liquid from a supply pipe into a tank, comprising a tube closed at its outer end and having apertures therein, means for removably and adjustably supporting said tube in a pendant position solely from said supply pipe independently of said tank, a sleeve adapted to slide upon said tube and having a series of perforations therein adapted to register with the apertures in said tube, and a float for controlling the motion of said sleeve, said float being positioned immediately above the apertures in said sleeve.

In testimony whereof I affix my signature in the presence of two witnesses.

GUSTAV STRANDT.

Witnesses:
A. J. McKerihan,
V. C. Weber.